(12) United States Patent
Oesterle et al.

(10) Patent No.: US 11,214,212 B2
(45) Date of Patent: Jan. 4, 2022

(54) METHOD FOR TRIGGERING SAFETY FUNCTIONS

(71) Applicant: Robert Bosch GmbH, Stuttgart (DE)

(72) Inventors: Florian Oesterle, Stuttgart (DE); Heiko Freienstein, Weil der Stadt (DE); Joerg Moennich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 15/913,517

(22) Filed: Mar. 6, 2018

(65) Prior Publication Data

US 2018/0265026 A1 Sep. 20, 2018

(30) Foreign Application Priority Data

Mar. 16, 2017 (DE) .......................... 102017204390.3

(51) Int. Cl.

| | |
|---|---|
| *G01C 22/00* | (2006.01) |
| *G05D 1/00* | (2006.01) |
| *B60R 21/0134* | (2006.01) |
| *B60W 30/08* | (2012.01) |
| *B60R 22/00* | (2006.01) |
| *E05F 15/00* | (2015.01) |
| *G05D 3/00* | (2006.01) |
| *G06F 7/00* | (2006.01) |
| *G06F 17/00* | (2019.01) |
| *G06F 17/10* | (2006.01) |
| *G06G 7/78* | (2006.01) |

(Continued)

(52) U.S. Cl.
CPC ......... *B60R 21/0134* (2013.01); *B60W 30/08* (2013.01); *G05D 1/0061* (2013.01); *G05D 1/0088* (2013.01); *B60R 2021/0027* (2013.01); *B60R 2021/01013* (2013.01); *B60R 2021/01034* (2013.01); *B60R 2021/01211* (2013.01); *B60R 2021/01252* (2013.01); *B60R 2021/01259* (2013.01); *B60R 2021/01272* (2013.01); *B60R 2021/01286* (2013.01)

(58) Field of Classification Search
CPC . B60R 21/0134; B60R 21/0136; B60R 21/36; B60W 30/08; G05D 1/0061; G05D 1/0088; G08G 1/16
USPC .............................. 701/23, 45, 301; 340/435
See application file for complete search history.

(56) References Cited

U.S. PATENT DOCUMENTS

| | | | | |
|---|---|---|---|---|
| 2004/0117116 A1* | 6/2004 | Rao | ...................... | B60R 21/0132 701/301 |
| 2014/0200773 A1* | 7/2014 | Wellhoefer | ......... | B60R 21/0134 701/45 |

(Continued)

FOREIGN PATENT DOCUMENTS

| | | |
|---|---|---|
| CN | 1125670 A | 7/1996 |
| DE | 10015273 A1 | 10/2001 |

*Primary Examiner* — Mahmoud S Ismail
(74) *Attorney, Agent, or Firm* — Norton Rose Fulbright US LLP; Gerard Messina

(57) ABSTRACT

A method for triggering at least two safety functions from a predefined plurality of safety functions in a motor vehicle, including a) recognizing a trigger signal for one first safety function, and b) generating a trigger signal for at least one second safety function, if according to step a) the trigger signal for the first safety function has been recognized, the first safety function being of a first function type and at least one of the second safety functions being of a second function type differing from the first function type.

14 Claims, 2 Drawing Sheets

(51) Int. Cl.
*G08G 1/16* (2006.01)
*B60R 21/01* (2006.01)
*B60R 21/00* (2006.01)

(56) References Cited

U.S. PATENT DOCUMENTS

2015/0329043 A1* 11/2015 Skvarce ................. B60Q 9/008
340/435
2016/0121834 A1* 5/2016 Kufer ................. B60R 21/0134
701/45
2016/0200275 A1* 7/2016 Le Merrer .......... B60R 21/0134
701/45

* cited by examiner

METHOD FOR TRIGGERING SAFETY FUNCTIONS

CROSS REFERENCE

The present application claims the benefit under 35 U.S.C. § 119 of German Patent Application No. DE 102017204390.3 filed on Mar. 16, 2017, which is expressly incorporated herein by reference in its entirety.

FIELD

The present invention relates to a method for triggering safety functions, in particular, in a motor vehicle.

BACKGROUND INFORMATION

Modern motor vehicles normally include a variety of safety functions, including, in particular, restraint systems such as airbags or seatbelt tighteners, as well as functions for intervening in the control of the motor vehicle, for example, by an emergency braking carried out automatically. Such safety systems are regularly triggered as a result of a variety of electronic signals from sensors being detected and processed by one or multiple control units. If in such systems it is recognized that a collision has already occurred or is unavoidably imminent, corresponding trigger signals for the safety functions to be triggered may be output. In certain accident situations, however, it may be the case with conventional methods that safety functions, which are intended to interact, are not triggered in the manner optimal for the interaction. An emergency braking may be initiated, for example, before a seatbelt tightener has been triggered. Avoidable injuries to the occupants may occur as a result.

SUMMARY

In accordance with the present invention, a particularly advantageous method is provided for triggering safety functions in a motor vehicle.

A safety function is understood here to mean any function, any measure or any system in the motor vehicle, which serves to ensure the safety of an occupant or of an external road user located outside the motor vehicle, in particular, in an accident situation. One of the safety functions may, for example, be an airbag or a seatbelt tightener. At least two safety functions of a plurality of such safety functions provided in the motor vehicle may be triggered with the described method.

The motor vehicle preferably includes a plurality of sensors, via which information about collisions that are potentially imminent or that have already taken place may be obtained. Sensors include, in particular, contact sensors such as acceleration sensors, with which it may be recognized whether a collision has taken place. Also included are surroundings sensors such as video cameras or laser scanners, with which potential collision objects in the surroundings of the motor vehicle may be recognized, in particular, prior to a potential imminent collision.

The pieces of information detected with the sensors are processed preferably in a control unit of the motor vehicle and/or by electronic components of the sensors and/or of the safety functions. If, in the process, a completed analysis of the information indicates that a collision has taken place or is unavoidably imminent, preferably at least one first of the safety functions is triggered. For this purpose, a corresponding trigger signal is preferably output by the control unit of the motor vehicle or by electrical components of the sensors and/or of the safety functions. An electronic component of a safety function may, for example, be an airbag control unit, into which signals of an acceleration sensor may be received, and which is intended and configured to output a trigger signal for one airbag or multiple airbags.

In step a) of the described method, a trigger signal for the first safety function is recognized. This may take place, for example, as a result of a trigger signal output by an airbag control unit to an airbag being measured and a signal corresponding to the measurement being conveyed to the control unit of the motor vehicle. The trigger signal according to step a) may be recognized, in particular, by the control unit of the motor vehicle.

With the described method, it is possible to trigger at least one second safety function, after the first safety function has been triggered, and the triggering of the first safety function according to step a) has been recognized. The triggering of the at least one second safety function in this case, takes place, in particular, due to the triggering of the first safety function or due to the output of the trigger signal for the first safety function. Such a triggering of the at least one second safety function may also be referred to as an entraining of the at least one second safety function by the first safety function.

To trigger the at least one second safety function, a trigger signal for the at least one second safety function is generated in step b) of the described method, if the trigger signal for the first safety function in step a) has been recognized. Step b) is carried out preferably after step a).

By triggering the at least one second safety function as a response to the triggering of the first safety function, it may be ensured that such safety functions, which are intended to interact, are also triggered together in an accident situation. For example, a seatbelt tightener (as the second safety function) may be triggered as a response to an initiated, automatic emergency braking (as the first safety function) in the case of an unavoidable imminent collision. This may prevent injuries to the occupants, which occur because even though an emergency braking is initiated, the occupants, due to untightened seatbelts, are injured by the seatbelts during the emergency braking.

The designation of the safety functions as first and second safety functions is used here merely for purposes of describing the method. In one case, for example, an airbag may be triggered as the first safety function and thereby cause the initiation of an emergency braking as the second safety function. In another case, however, the emergency braking may also be triggered as the first safety function and, in the process, cause the triggering of the airbag as the second safety function. In yet another case, the emergency braking may be triggered as the first safety function and cause the transmission of an emergency call and the triggering of a seatbelt tightener as two second safety functions. Thus, a safety function may be both a first safety function as well as (in another accident situation) a second safety function.

According to the described method, the first safety function is of one first function type and at least one of the second safety functions is of another function type.

Safety functions of the same function type have in common the fact that these safety functions are connected to the control unit via a shared or at least similar interface. This means that safety functions of the same function type may, for example, be triggered with trigger signals of an identical (data) format.

With the described method, in particular, the triggering of safety functions of various function types with one another is linked. This is avoided in approaches according to the related art, in particular, due to different interfaces between the safety functions and the control unit. Contributing to this is, in particular, the fact that safety functions of different function types are routinely supplied by different manufacturers. As a result of this, in particular, an interaction of safety functions of various function types may be significantly impeded.

One trigger signal each for at least two second safety functions is preferably generated in step b), if according to step a) the trigger signal for the first safety function has been recognized, the first safety function being of one first function type and at least one of the second safety functions being of another function type. The advantage of the interaction of safety functions of various function types may be enhanced by the fact that not only at least one second safety function [is triggered], but at least two second safety functions are triggered in step b).

In one preferred specific embodiment of the method, the first safety function and the at least one second safety function are associated with various function types described below.

One function type includes, in particular, an intervention by at least one driver assistance system. This may be, for example, an execution of an automatic emergency braking and/or an intervention of a lane keeping assistant. One function type also includes an influencing of at least one system for autonomous driving. This may be, for example, an activation or deactivation of a highway pilot and/or an activation or deactivation of a pilot for general autonomous driving. By deactivating a system for autonomous driving, the driving task is restored to the driver. This may be expedient, in particular, in situations in which a human judgment of a situation is more reliable than a judgment of the situation by the system for autonomous driving. One function type further includes a triggering of at least one protection system for occupants of the motor vehicle or a changing (in particular, lowering) of a trigger threshold of such a protection system. This may be, for example, an activation of one or of multiple electrical and/or pyrotechnical seatbelt tighteners, a triggering of one or of multiple airbags and/or an activation of one or of multiple active head restraints (which may be electrically and/or pyrotechnically adjusted for protecting occupants). A further function type includes a triggering of at least one protection system for external road users or a changing (in particular, lowering) of a trigger threshold of such a protection system. This may be, for example, the triggering of a pedestrian airbag. A further function type includes a changing of at least one active structure of a body of the motor vehicle. This may be, for example, a triggering of an active (in particular, pyrotechnically triggered) roll-over protection (in particular, in cabriolets). A further function type includes an adjustment of at least one convenience function for protecting occupants of the motor vehicle. This may be, for example, an adjustment of one or of multiple seats and/or an adjustment of a sunroof and/or of one or of multiple windows. A further function type includes a triggering of at least one multimedia function. This may be, for example, a transmission of an emergency call and/or a generation of an acoustic protection signal and/or alarm signal.

The lowering of a trigger threshold may also be referred to as a preset function. If, for example, an imminent collision is recognized, it may be responded to by lowering a trigger threshold of airbags (at least for a period of time expected for the imminent collision). If the predicted collision then actually occurs, the airbags are triggered with greater reliability than without previous lowering of the trigger threshold. The advantages of a low trigger threshold (i.e., in particular, the reliable triggering of the airbag) for the period of time expected for the imminent collision may significantly outweigh the corresponding disadvantages (i.e., in particular, the increased risk of an erroneous triggering).

In another preferred specific embodiment of the method, the first safety function and the at least one second safety function are associated with various function types described below:

One function type includes active functions, which are triggered by the receipt of a trigger signal, and which furthermore may assist in triggering additional safety functions using an emitted signal. This may be, for example, an execution of an automatic emergency braking, an intervention of a lane keeping assistant, an activation of a highway pilot, an activation of a pilot for general autonomous driving, an activation of one or of multiple electrical and/or pyrotechnical seatbelt tighteners, a triggering of one or of multiple airbags, an activation of one or of multiple head restraints, a triggering of an active roll-over protection and/or a transmission of an emergency call.

Another function type includes passive functions, which may be triggered by the receipt of a trigger signal. Passive functions, unlike active functions, may not assist in triggering additional safety functions using an emitted signal. The passive functions may be, for example, an adjustment of one or of multiple seats, an adjustment of a sunroof and/or of one or of multiple windows and/or a generation of an acoustic protection signal and/or alarm signal.

In another specific embodiment, the control unit carries out the sub-steps a1) and a2) before step b) for generating the trigger signal for the second safety function.

In step a1), it is recognized based on sensor data whether a hazardous situation exists. In this case, respective sensor data are recorded using preferably a plurality of sensors (in particular, via contact sensors and/or surroundings sensors). The recorded data are preferably processed in the control unit. A hazardous situation to be recognized in such case includes, in particular, a collision that has already occurred or a potentially imminent collision. A hazardous situation may also exist, however, if no collision occurs. For example, a collision may be avoided by an evasive maneuver and/or by an emergency braking. Even in such a case, an endangering of the occupants of the motor vehicle and/or of external road users may occur.

In step a2), a trigger signal for triggering the at least one first safety function is output, if a hazardous situation has been recognized in step a1). Thus, the hazardous situation recognized in step a1) may be acted upon. The trigger signal for the first safety function output in step a1), in particular, may be recognized in step 1).

Step b) in this specific embodiment also includes at least the sub-steps b1), b2) and b3).

In step b1), the plurality of safety functions is monitored in order to recognize whether a trigger signal for triggering one of the safety functions as a first safety function has been output. This monitoring may include, in particular, the measuring of a current and/or of a voltage in respective connecting lines between the control unit of the motor vehicle and/or electrical components of the safety functions (such as, for example, an airbag control unit) and the respective safety functions. In this case, it may be recognized whether and when a trigger signal has been conveyed via the corresponding connecting lines.

In step b2), a metalogic is accessed, if a trigger signal for triggering the first safety function has been recognized in step b1). The metalogic defines links of the plurality of safety functions from one another. The metalogic is implemented preferably as a type of matrix in the control unit. The metalogic has a respective input and a respective output preferably for each safety function. For passive safety functions, the metalogic need not include a respective input. For each of the inputs of the metalogic (and, therefore, for the corresponding safety functions), preferably one or multiple links to outputs of the metalogic are defined by the metalogic.

If one of the safety functions (as the first safety function) is triggered, a signal is then preferably introduced into the corresponding input of the metalogic. Such an introduction of a signal into an input of the metalogic, in particular, is understood to mean the accessing of the metalogic.

In step b3), corresponding trigger signals for triggering the at least one second safety function are specified, if a link between the first safety function and the at least one second safety function is defined in the metalogic. A signal that is introduced into an input of the metalogic according to step b2) is preferably forwarded by the links of this input defined in the metalogic to outputs of the metalogic (or a corresponding new signal is generated for each of these outputs). Such a signal present at an output may, as a trigger signal, trigger the safety function (as second safety function) connected to the respective output.

In another preferred specific embodiment of the method, at least one parameter for each link between one first safety function and one second safety function, which is taken into account in the triggering of the second safety function, is storable in the metalogic.

The at least one parameter may be, in particular, a time parameter. With such a time parameter, it may preferably be established at which point in time after the triggering of the first safety function the corresponding second safety function is triggered. The time parameter in this case may be a waiting period before the triggering of the second safety function relative to the triggering of the first safety function or else it may take place relative to a global accident time parameter (available for a plurality of safety functions). The at least one storable parameter may also specify whether and to what extent a trigger threshold of a second safety function is to be lowered, if a first safety function has been triggered.

In another preferred specific embodiment of the method, a respective cascade of safety functions to be triggered as second safety functions in step b3) is established in the metalogic for at least one of the safety functions.

If a safety function is triggered as the first safety function, a cascade of second safety functions is triggered according to this specific embodiment in step b3). A cascade for at least one of the safety functions is established in the metalogic in the event this safety function is triggered as a first safety function. A safety function, for which such a cascade is defined, may also be included as a second safety function in a cascade of another safety function.

A hazardous situation may be recognized, for example, by sensors of the motor vehicle, as a result of which a change of trigger thresholds (for example, of multiple airbags) takes place. This involves the first safety function, for the triggering of which a cascade having the following steps may be established:

influencing a system for autonomous driving (for example, by adapting the driving behavior to an accident situation and/or by restoration of the driving task from the system for autonomous driving to the driver), triggering a multimedia function (for example, by outputting at least one warning to the driver and/or by outputting at least one warning to other road users), intervention of a driver assistance system (for example by carrying out an emergency braking), triggering of protection systems for occupants of the motor vehicle (for example, by triggering at least one airbag), triggering of protection systems for external road users (for example, by triggering a pedestrian protective measure).

In another preferred specific embodiment of the method, the method steps a) and b) are carried out repeatedly in such a way that all links of triggered safety functions stored in the metalogic are processed to form additional safety functions.

In one example for this specific embodiment, a driver airbag is triggered as a first safety function, for which a link to an intervention by a driver assistance system is defined in the matrix as a second safety function. The intervention by the driver assistance system is correspondingly triggered by step b). The triggering of the intervention by the driver assistance system may, in turn, be recognized according to step a). For step a) the intervention by the driver assistance system is a first safety function. For this safety function, the transmission of an emergency call and the triggering of the driver airbag, for example, may be established in the metalogic as two second safety functions. In that event, the driver airbag is not triggered, because this airbag has already been triggered (as the first step of this example). With the method according to this specific embodiment, the steps a) and b) are many times carried out repeatedly in such a way until all safety functions linked to at least one triggered safety function are triggered.

As another aspect, a control unit for a motor vehicle is presented, which is configured to carry out a method in accordance with the present invention.

The particular advantages and design features of the method described above are applicable and transferable to the described control unit, and vice versa.

In one preferred specific embodiment of the control unit, the metalogic is implemented in the manner of a matrix in the control unit, the control unit being connected to all safety functions and being configured to centrally control the triggering of the safety functions.

A computer program, which is configured to carry out all steps of the described method, as well as a machine-readable memory medium on which the computer program is stored, are also to be described here. The particular advantages and design features of the method and of the control unit described above are applicable and transferable to the described computer program and to the described machine-readable memory medium.

Additional details of the described method and of the control unit are explained in greater detail as an exemplary embodiment based on the figures. The possible specific embodiments of the described method and of the described control unit are not limited to the exemplary embodiment depicted in the figures.

DETAILED DESCRIPTION OF EXAMPLE EMBODIMENTS

Figure 1:
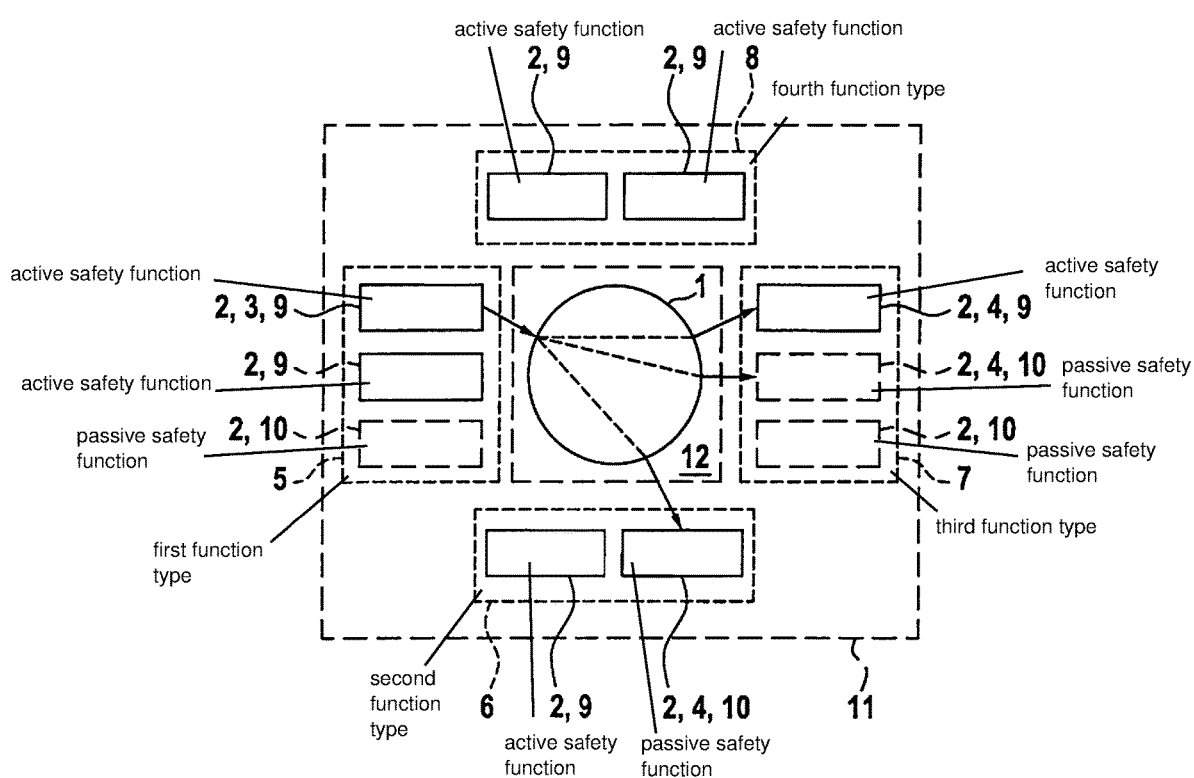
FIG. 1 shows a motor vehicle and a control unit in accordance with the present invention.

FIG. 1 shows a control unit 12 of a motor vehicle 11, which is configured to carry out a method for triggering safety functions 2 of motor vehicle 11. One of the safety functions 2 is first triggered in this example as a first safety function 3. A corresponding trigger signal of first safety function 3 may be recognized with control unit 12. A metalogic 1 of control unit 12 may then be accessed, as indicated by an arrow. Links between the safety functions 2 are established in metalogic 1. Only the links that start from first safety function 3 are delineated by dashed lines in this representation. In this example, respective trigger signals corresponding to these links are output by control unit 12 as second safety functions 4 for three of the safety functions 2. This, too, is delineated by corresponding arrows. Remaining safety functions 2 (i.e., which are neither first safety function 3 nor second safety function 4) are not triggered here. For the sake of clarity, FIG. 1 only shows how second safety functions 4 are triggered by the triggering of first safety function 3. The triggering of second safety functions 4 may also cause the triggering of additional safety functions 2.

First safety function 3 is associated with a first function type 5. Second safety functions 4 are associated with a second function type 6 or with a third function type 7. Additional safety functions 2, which are not triggered in this example, are associated with a fourth function type 8. In addition, safety functions 2 may be subdivided into active functions 9 (which are depicted with solid lines) and passive functions 10 (which are depicted with dashed lines).

Figure 2:
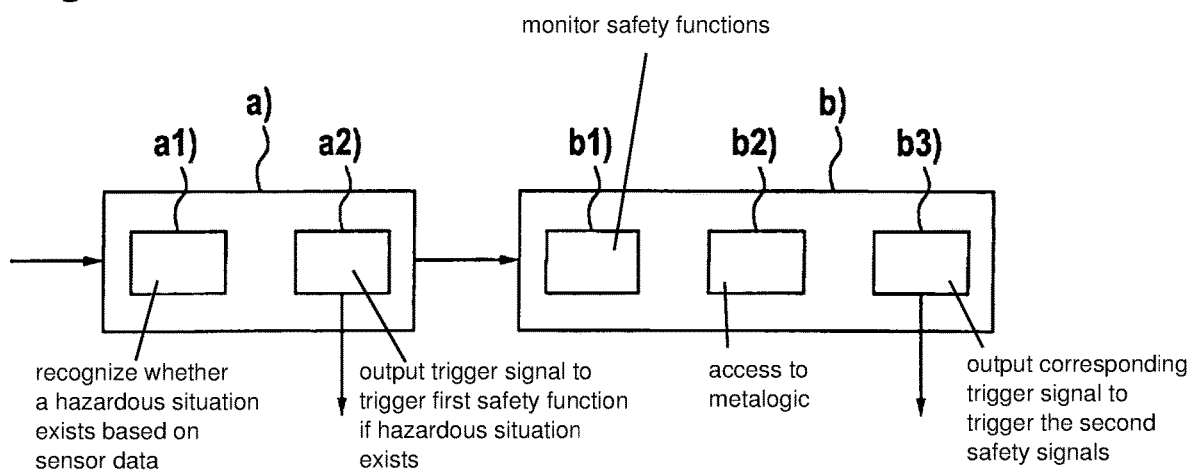
FIG. 2 shows a flow chart of a method in accordance with the present invention.

FIG. 2 shows a flow chart of the described method, the various boxes representing the method steps a) and b), in each case with the sub-steps a1) and a2), respectively, b1), b2) and b3). The sub-steps a2) and b3) each output trigger signals for triggering safety functions.

What is claimed is:

1. A method for triggering at least two safety functions from a predefined plurality of safety functions in a motor vehicle, the at least two safety functions including a first safety function and at least one second safety function that is different than the first safety function, and the method comprising:
in an instance in which the first safety function is triggered, generating a trigger signal to trigger the at least one second safety function in response to a recognition of a trigger signal, which has been generated in response to a recognized occurrence of an event, to trigger the first safety function, the generation of the trigger signal to trigger the at least one second safety function not being performed in response to the recognized occurrence of the event.

2. The method as recited in claim 1, wherein the first safety function and each of the at least one second safety function are different from one another, and the first safety function and each of the at least one second safety function is a respective function selected from a group consisting of:
intervention by at least one driver assistance system;
influencing of at least one system for autonomous driving;
triggering of at least one protection system for occupants of the motor vehicle;
changing of a trigger threshold of at least one protection system for occupants of the motor vehicle;
triggering of at least one protection system for external road users;
changing of a trigger threshold of at least one protection system for external road users;
changing at least one active structure of a body of the motor vehicle;
adjusting at least one convenience function for the protection of occupants of the motor vehicle; and
triggering of at least one multimedia function.

3. The method as recited in claim 1, wherein:
the first safety function is of an active function type;
one or more of the at least one second safety function is of a passive function type;
recognition of trigger signals that trigger functions that are of the passive function type does not result in a responsive triggering of any other of the at least two safety functions; and
for each safety function that is of the active function type, recognition of a trigger signal that triggers the respective function is responded to by triggering, or evaluating whether to trigger, another of the at least two safety functions.

4. A method for triggering at least two safety functions from a predefined plurality of safety functions in a motor vehicle, the at least two safety functions including a first safety function and at least one second safety function that is different than the first safety function, and the method comprising:
a) recognizing a trigger signal that triggers the first safety function; and
b) responsive to the recognition of the trigger signal that triggers the first safety function, generating a trigger signal to trigger the at least one second safety function;
wherein:
the recognized trigger signal that triggers the first safety function is output in response to a recognition of an existence of a hazardous situation based on sensor data;
the recognition of the trigger signal is performed by monitoring each of one or more of the plurality of safety functions in order to recognize whether one or more trigger signals for triggering any of the one or more of the plurality of safety functions has been output; and
the generating of the trigger signal responsive to the recognition of the trigger signal includes:
accessing a metalogic responsive to the recognition of the trigger signal that triggers the first safety function, the metalogic defining links from one or more of the plurality of safety functions, including the first safety function, to one or more other ones of the plurality of safety functions, including the at least one second safety function; and
outputting one or more trigger signals for triggering the at least one second safety function in response to identification of a definition in the metalogic of a link from the first safety function to one or more of the at least one second safety function.

5. The method as recited in claim 4, wherein for each of one or more of the links that respectively links from a respective one of the plurality of safety functions to a respective one or more other of the plurality of safety functions, at least one parameter, which is taken into account in the triggering of the one or more other of the plurality of safety functions, is stored in the metalogic.

6. The method as recited in claim 4, wherein for at least one of the plurality of safety functions, the metalogic defines a respective cascade of others of the plurality of safety functions to be triggered responsive to a recognition of a trigger signal of the at least one of the plurality of safety functions.

7. The method as recited in claim 4, wherein the steps a) and b) are carried out repeatedly in such a way that a plurality of the links defined by the metalogic are processed to form a chain of triggers of respective ones of the plurality of safety functions, one of the plurality of safety functions that is one of the at least one second safety function in one iteration of the carrying out of the steps a) and b) being the first safety function in a subsequent iteration of the carrying out of the steps a) and b).

8. A control unit for a motor vehicle, the control unit comprising a computer, wherein the computer is configured to perform a method for triggering at least two safety functions from a predefined plurality of safety functions in the motor vehicle, the at least two safety functions including a first safety function and at least one second safety function that is different than the first safety function, and the method comprising:

in an instance in which the first safety function is triggered, generating a trigger signal to trigger the at least one second safety function in response to a recognition of a trigger signal, which has been generated in response to a recognized occurrence of an event, to trigger the first safety function, the generation of the trigger signal to trigger the at least one second safety function not being performed in response to the recognized occurrence of the event.

9. A control unit for a motor vehicle, the control unit comprising a computer that is configured to perform a method for triggering at least two safety functions from a predefined plurality of safety functions in the motor vehicle, wherein:

the at least two safety functions including a first safety function and at least one second safety function that is different than the first safety function;

the method comprises:
 a) recognizing a trigger signal that triggers the first safety function; and
 b) responsive to the recognition of the trigger signal that triggers the first safety, generating a trigger signal to trigger the at least one second safety function;

the recognized trigger signal that triggers the first safety function is output in response to a recognition of existence of a hazardous situation based on sensor data;

the recognition of the trigger signal is performed by monitoring each of one or more of the plurality of safety functions in order to recognize whether one or more trigger signals for triggering any of the one or more of the plurality of safety functions has been output; and the generating of the trigger signal responsive to the recognition of the trigger signal includes:
 accessing a metalogic responsive to the recognition of the trigger signal that triggers the first safety function, the metalogic defining links from one or more of the plurality of safety functions, including the first safety function, to one or more other ones of the plurality of safety functions, including the at least one second safety function; and
 outputting one or more trigger signals for triggering the at least one second safety function in response to identification of a definition in the metalogic of a link from the first safety function to one or more of the at least one second safety function.

10. The control unit as recited in claim 9, wherein the metalogic is implemented as a matrix in the control unit, and the control unit is connected to, and is configured to centrally control, all of the plurality of safety functions.

11. A non-transitory machine-readable memory medium on which is stored a computer program that is executable by a computer and that, when executed by the computer, causes the computer to perform a method for triggering at least two safety functions from a predefined plurality of safety functions in a motor vehicle, the at least two safety functions including a first safety function and at least one second safety function that is different than the first safety function, and the method comprising:

in an instance in which the first safety function is triggered, generating a trigger signal to trigger the at least one second safety function in response to a recognition of a trigger signal, which has been generated in response to a recognized occurrence of an event, to trigger the first safety function, the generation of the trigger signal to trigger the at least one second safety function not being performed in response to the recognized occurrence of the event.

12. The non-transitory machine-readable memory medium as recited in claim 11, wherein the generating of the trigger signal to trigger the at least one second safety function is performed in response to the recognition that the first safety function has been triggered.

13. The method as recited in claim 1, wherein the generating of the trigger signal to trigger the at least one second safety function is performed in response to the recognition that the first safety function has been triggered.

14. The control unit as recited in claim 8, wherein the generating of the trigger signal to trigger the at least one second safety function is performed in response to the recognition that the first safety function has been triggered.

* * * * *